United States Patent [19]

Tsutsui et al.

[11] Patent Number: 5,191,572
[45] Date of Patent: Mar. 2, 1993

[54] OPTICAL RECORDING AND PLAYBACK SYSTEM OF DUAL LIGHT SOURCE TYPE

[75] Inventors: Keiichi Tsutsui, Kagaokakyo; Kazuo Tsuboi; Koji Sogo, both of Takatsuki, all of Japan

[73] Assignee: Omron Corporation, Kyoto, Japan

[21] Appl. No.: 475,851

[22] Filed: Feb. 6, 1990

[30] Foreign Application Priority Data

Feb. 20, 1989 [JP] Japan .................................. 1-41394

[51] Int. Cl.⁵ ................................................ G11B 7/00
[52] U.S. Cl. .................................. 369/44.38; 369/124
[58] Field of Search ............ 369/116, 109, 122, 44.39, 369/44.38, 48

[56] References Cited

U.S. PATENT DOCUMENTS

| | | | |
|---|---|---|---|
| 4,516,242 | 5/1985 | Yokota | 369/116 |
| 4,685,097 | 8/1987 | van der Put | 369/116 |
| 4,700,336 | 10/1987 | Yoshida et al. | 369/110 |
| 4,855,988 | 8/1989 | Shinbayashi et al. | 369/116 |
| 4,998,237 | 3/1991 | Osakabe et al. | 369/109 |
| 5,001,692 | 3/1991 | Farla et al. | 369/116 |

FOREIGN PATENT DOCUMENTS

| | | | |
|---|---|---|---|
| 0289004 | 2/1988 | European Pat. Off. | 369/44.39 |
| 229542 | 8/1987 | Japan | 369/44.39 |

*Primary Examiner*—Donald McElheny, Jr.
*Attorney, Agent, or Firm*—Dickstein, Shapiro & Morin

[57] ABSTRACT

A dual light source optical recording and playback system which comprises a first light source which is a semiconductor laser for irradiating tracks of a recording medium with recording spot light to record pits as information units, a second light source for irradiating the tracts with playback spot light, detection means for detecting the output of the semiconductor laser which changes in response to return light available as the recording spot light is reflected on the track of the recording medium and returned to the semiconductor laser, and a timing signal generator for generating a timing signal for the recording of the next pit on the track in response to a detection output from the detection means which corresponds to the return light due to reflection by the recorded pit.

8 Claims, 4 Drawing Sheets

Direction of movement of recording medium

OPTICAL RECORDING AND PLAYBACK SYSTEM OF DUAL LIGHT SOURCE TYPE

BACKGROUND OF THE INVENTION

1. Field of the Invention

The present invention relates to a dual light source optical recording and playback system which comprises a first light source, which is a semiconductor laser for irradiating tracks of a recording medium with a recording spot light to produce pits as information units, and a second light source for irradiating the tracks of the recording medium with a reading spot light.

2. Brief Description of the Related Art

A dual light source optical recording and playback system has an advantage of approximately doubled recording speed over a single light source system which twice scans a recording medium. The effective recording speed is about doubled because of the so-called verifying function. To verify a recording with a dual light source system, a pit recorded on the track of a recording medium with a recording spot light from a semiconductor laser as a first light source can be played back by a playback spot light from a second light source to thereby confirm that the pit has been properly recorded, thus eliminating the necessity for twice scanning the track with spot light as required in a single light source system.

Two formats are known for recording information on a card-type recording medium which is used in association with a dual light source optical recording and playback system, one being illustrated in FIG. 6 and the other being illustrated in FIG. 7.

Referring first to FIG. 6, a first format using gaps between sectors is explained below.

As illustrated in FIG. 6 (1), information is recorded in four sectors A to D on one track of the recording medium. The sectors A to D, respectively, consist of sector information regions a1 to d1 and data regions a2 to d2. As shown in FIG. 6 (2), which is an expanded view of the area encircled by the broken line in FIG. 6 (1), sector A includes recorded pits P1 (black dots), a gap G between sector A and sector B, and unrecorded pits P2 (white dots). The change in the interval between pits within the respective sectors A to D represents data lengths consisting of bits which are the constituent unit of digital data, "1" or "0".

When new pits P2 are to be added in sector B on the track of such a recording medium, the end of sector A is first detected and, with the interposition of gap G, the sector information region b1 and data region b2 are then recorded.

In continuous playback of sectors A to D, the playback signal is interrupted at ga G between any two of the respective sectors A to D. Therefore, the timing (synchronization) of playback signal reading is disturbed. To solve this problem, the playback system is arranged so that synchronization is sought upon detection of the first playback signal for each of sectors A to D.

To increase the amount of information that can be recorded in a medium and avoid the disturbance of timing at the junction between sectors, there has been proposed a format without any gap G between sectors (hereinafter referred to as "continuous write format"), as illustrated in FIG. 7.

As shown in FIG. 7 (1) and (2), this continuous write format has no gap between any two of the respective sectors A to D but, instead, pits P1, ..., P2..., etc., are continually recorded. In this arrangement, it is no longer necessary to seek timing at the point of transition between any two of the respective sectors A to D and the timing, once established within any given track, is retained as it is, thus permitting playback of information in all the sectors.

However, in order to record, for example, pits P2 in sector B after sector A in which pits P1 have already been recorded, the writing of pits P2 in sector B must be performed in good timing with the recording of pits P1 in sector A so that the necessary synchronization may be obtained in playback. For this purpose, it is necessary to provide a pit corresponding to a mark or pattern indicative of the end of each sector of A to D, viz. a "sector end pattern" and, for additional writing, to record the first pit P2 (referred to as pit bP1) for sector B in the position timed with the final pit P1 (referred to as pit aP1) in the sector end pattern for sector A.

If the above dual light source optical recording and playback system is so designed, for assuring an increased effective recording speed, that the recording spot light from a semiconductor laser precedes the playback spot light from second light source on the track with respect to the direction of travel of the recording medium, then it is impossible to verify that the recording spot light is located at that position of pit bP2 because the sector end pattern has not been thoroughly played back with the playback spot light yet, even if the recording spot light arrives at the position of the first pit bP2 in sector B which is to be thereby recorded.

For the above reason, in the case of the continuous write format, it is advantageous to arrange the system so that the playback spot light precedes the recording spot light on the track with respect to the direction of travel of the recording medium. Such an arrangement, however, cancels out the advantage of the dual light source system in regard to improving the effective recording speed.

Furthermore, if the system is so arranged that, with the recording spot light preceding the playback spot light for taking advantage of the dual light source system, the axis of playback spot light is located closer to the axis of recording spot light so that when the recording spot light arrives at the position of pit bP2 in sector B, the pit aP1 in sector A will be played back with the playback spot light to complete the detection of the sector end pattern. The light output from the first light source, which is a semiconductor laser having large output power, tends to interfere with the playback spot light and, hence, prevent accurate playback. This means that the distance between the two spot lights must be accurately controlled. However, it is impossible to design a recording and playback system that will assure the constant distance unaffected by changes in ambient temperature, aging and other internal and external factors.

SUMMARY OF THE INVENTION

It is an object of the present invention to facilitate system design by eliminating the above-mentioned need for complicated adjustment in the arrangement in which the recording spot light precedes the playback spot light on the track and to enable the recording and playback of pits in respective sector in a continuous write format in such a manner that the advantage of the high effective recording speed of the dual light system may be fully maintained.

The above-mentioned objects are accomplished by providing a dual light source optical recording and playback system, according to the present invention, which comprises a first light source which is a semiconductor laser for irradiating tracks of a recording medium with a recording spot light to write pits as information units, a second light source for irradiating the tracks with playback spot light, detecting means for detecting the light output of the semiconductor laser which varies in response to the return light of the recording spot light available as the latter is reflected on the track of a recording medium and returned to the semiconductor laser, and a timing signal generator for generating a timing signal for the recording of the next pit on the track in response to the detection output from the detection means corresponding to the return light available by the reflecting of a recording spot light by the recorded pit.

In this optical recording and playback system of the invention, the detection means detects the laser output which changes according to the return light of recording spot light reflected back to the semiconductor laser and the timing signal generator, functioning in response to the detection output of the detecting means, generates a timing signal for the recording of the next pit on the track.

Since the timing for recording of the next pit can be obtained from the recording spot light in the above arrangement, an increased effective recording speed is realized by causing the recording spot light to precede the playback spot light on the track and, at the same time, the need for control of the distance between the spot lights, viz. bringing the axes of two lights closer to each other, is eliminated. Furthermore, the invention enables continuous writing as well.

BRIEF DESCRIPTION OF THE DRAWINGS

The above and other objects and advantages of the invention will become apparent from the following description taken with the accompanying drawings in which.

DETAILED DESCRIPTION OF THE PREFERRED EMBODIMENTS

Referring to the accompanying drawings, the dual light source optical recording and playback system as an embodiment of the present invention comprises a first light projector assembly A1 for irradiating tracks TK1, TK2, ... of a recording medium RM with recording spot light SP1, a second light projector assembly A2 for irradiating the tracks TK1, TK2, etc., with playback spot light SP2, and a light receiving assembly B for receiving the reflection light of the playback spot light SP2 from recording medium RM to read the pits formed as information units on the tracks of recording medium RM.

The first light projector assembly A1 includes a semiconductor laser LD as the first light source and a collimator CL1 adapted to collimate the output light forwardly emerged from said semiconductor laser LD. The resultant parallel rays of light pass through a beam splitter BS and a half mirror HM and are focused by an objective lens TL on one of the tracks TK1, TK2, ... of recording medium RM to form the recording spot light SP1 which is about 1 $\mu$m in diameter. As the recording spot light SP1 impinges on the tracks TK1, TK2, ... of recording medium RM, the pits are recorded. Each pit is either lower in light reflectance than the other area of recording medium RM or in a shape such that the incident light is scattered there so as to reduce the amount of light received by a photodiode PD monitoring the reflection light.

Figure 2:
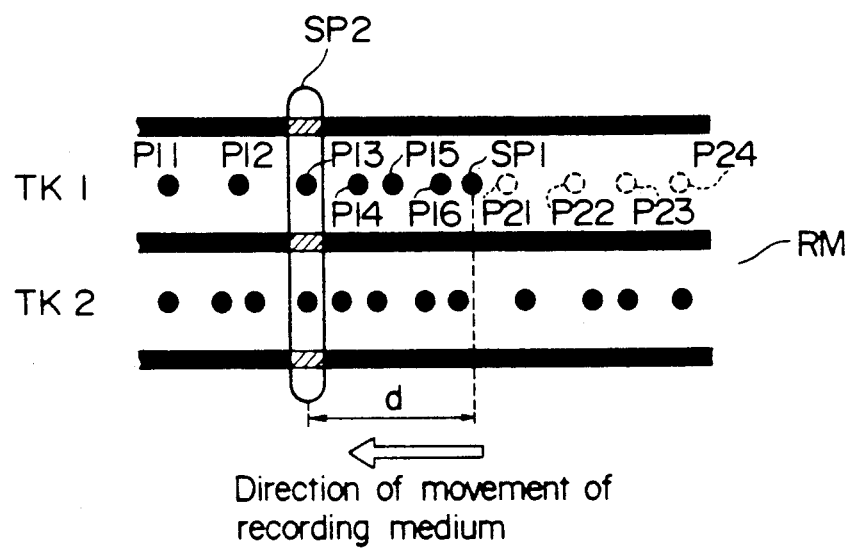
FIG. 2 is a partial plan view showing a linear card recording medium used in association with the recording and playback system of the above embodiment.

The second light projector assembly A2 includes a light-emitting diode LED as the second light source and a collimator CL2 adapted to collimate the output light of the light-emitting diode LED. The resultant parallel rays of light pass through the same beam splitter BS and half mirror HM mentioned for the first projector assembly A1 and are focused by the objective lens TL on the track TK1, TK2, ... of recording medium RM to form the playback spot light SP2 which is about a few to tens of micrometers in diameter. Since the light-emitting diode LED is large and its emission is not coherent, the diameter of the playback spot light SP2 is larger than that of the recording spot light SP1 coming from the semiconductor laser LD as will be seen from FIG. 2. Also as shown in FIG. 2, this playback spot light SP2 is incident on the track immediately behind the position of incidence of the recording spot light SP1. Since the amount of reflection light differs according to whether the spot light is located at the pit or not, the presence of the pit can be read from the amount of this reflection light.

The light-receiving assembly B comprises a condenser lens SL and a photodiode PD. Thus, the playback spot light SP2 reflected by the recording medium RM passes through the objective lens TL and is reflected by the half-mirror HM. This reflection light is condensed by the condenser SL and received by the photodiode PD. Based on this reception signal, the presence of a pit or the information corresponding to the pit can be successfully read.

Figure 1:
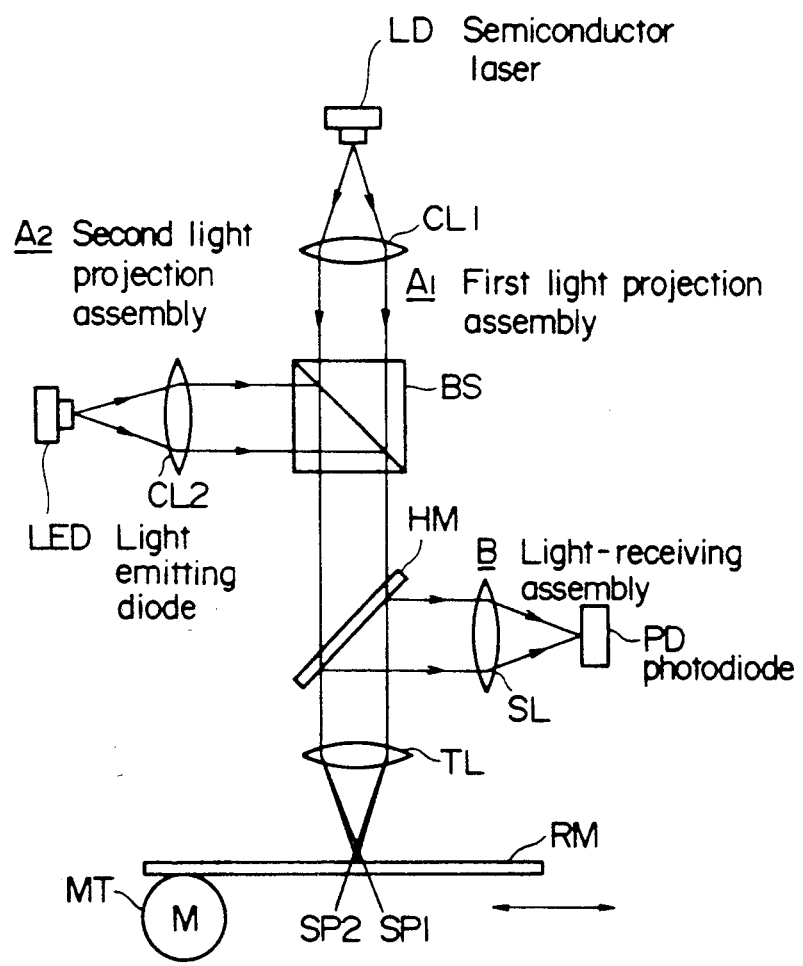
FIG. 1 is a schematic view showing a dual light source recording and playback system embodying the principles of the invention.

The recording medium RM is driven by a motor MT in linear reciprocating motion as indicated by the arrow marks in FIG. 1, whereby the serial recording and playback of information are carried out. Referring to FIG. 2, the recording medium RM carries recorded pits P11 to P16, each indicated by a black dot, on the tracks TK1, TK2, ... . The white dots represent unrecorded pits P21 to P24. Furthermore, with respect to the direction of travel of the recording medium 4 which is indicated by the arrow mark in FIG. 2, the recording spot light SP1 is incident ahead of the playback spot light SP2.

Furthermore, also as illustrated in FIG. 2, the respective optics are so arranged that the recording spot light SP1 and playback spot light SP2 are separated from each other by a distance of about d, for example 10 μm, in the plane of the tracks in order that only the reflection light of the playback spot light SP2 is received by photodiode PD and the scattered reflection light of recording spot SP1 is not received by photodiode PD.

Figure 3:
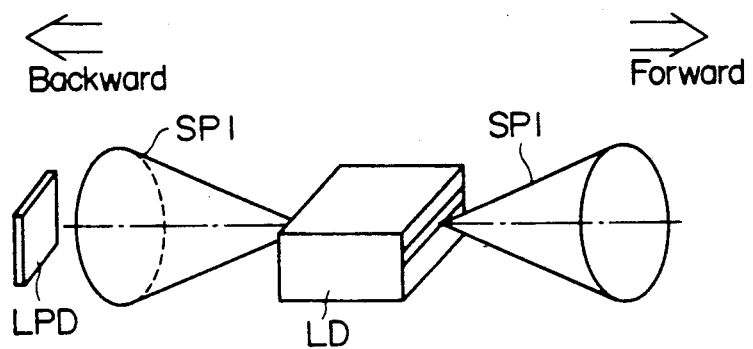
FIG. 3 is a schematic diagram illustrating the action of the semiconductor laser used in the same recording and playback system.
Figure 4:
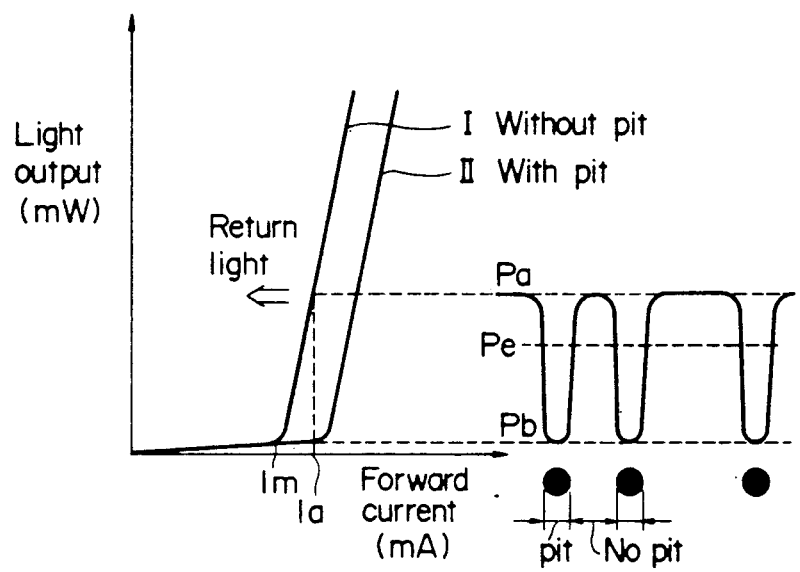
FIG. 4 is a diagrammatic representation of the light output characteristics of the semiconductor laser with respect to the return light.

FIG. 3 is a schematic view showing the construction of the semiconductor laser LD. FIG. 4 is a graphic representation of the forward current characteristic of the semiconductor laser LD, in which the light output (mW) of semiconductor laser LD corresponding to the return light is plotted on the ordinate and the forward current (mA) of semiconductor laser LD on the abscissa. Referring to FIG. 4, I indicates the characteristic curve in the case where the return light to the semiconductor laser LD is the light coming back from the area where no pit is available and II represents the characteristic curve in the case where the return light is coming from the area where a pit is available. Furthermore, Im indicates a threshold current from which the level of light emission from the semiconductor laser LD rises. The semiconductor laser LD is driven by a constant current Ia which is not less than the threshold current Im. The semiconductor laser LD projects recording spot light SP1 of the intensity corresponding to this constant current Ia to the recording medium RM located forward and, at the same time, projects the corresponding light SP1' backward. It is so arranged that this backward light SP1' is detected by a photodetector LPD in the same housing which accommodates the semiconductor laser LD. The semiconductor laser LD has such a property that the magnitude of light SP1' varies in response to the return light of the recording spot light SP1 reflected by the tracks TK1, TK2, ... of recording medium RM. Thus, as shown in FIG. 4, when the return light of recording spot light SP1 is reflected from the pit-free area with high reflectance, that is to say a return light of high intensity, the characteristic curve due to the backward light SP1 of the semiconductor laser LD is as indicated by I. On the other hand, when the return light of recording spot light SP1 is reflected from a pit on the recording medium RM, that is to say a return light of low intensity, the characteristic curve due to the backward light SP1' is as indicated by II. Thus, even though the semiconductor laser LD is driven by the constant current Ia, the level of light output from the semiconductor laser LD corresponding to its backward light SP1' may vary between Pa and Pb according to the presence or absence of a pit.

Therefore, the photodetector LPD may output a detection signal corresponding to the presence or absence of a pit on the basis of the light output of semiconductor laser LD which varies between Pa and Pb in response to the return light coming back thereto.

Figure 5:
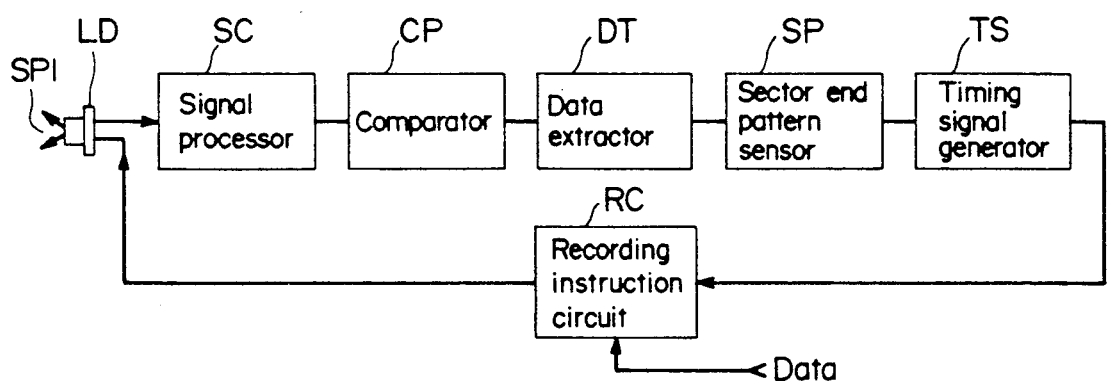
FIG. 5 is a block diagram showing the internal circuits of the same recording and playback system.
Figure 6:
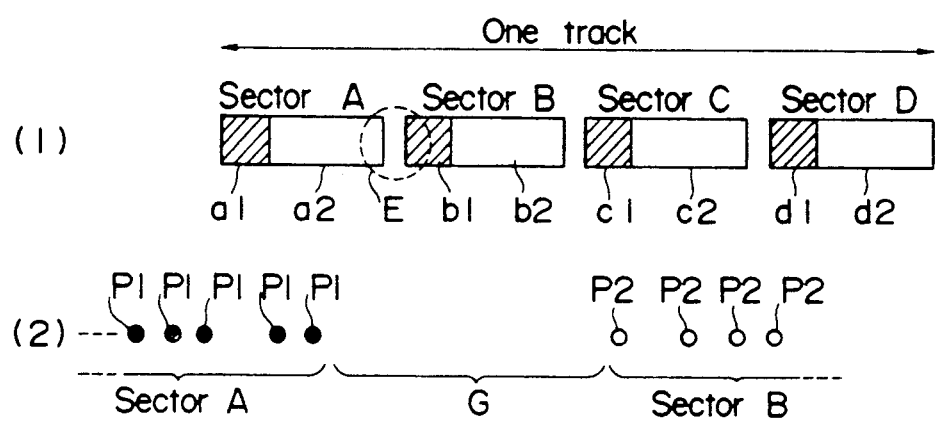
FIG. 6 is a view showing a write format with gaps between sectors.

FIG. 5 is a block diagram showing the internal circuitry of an optical recording and playback system according to the above embodiment, which is adapted to detect the end of a given sector with respect to the recording medium RM according to the output of the photodetector LPD and enable the additional writing of a pit in the initial area of the next new sector in the position timed with the last pit constituting the end pattern of the first-mentioned sector.

Figure 7:
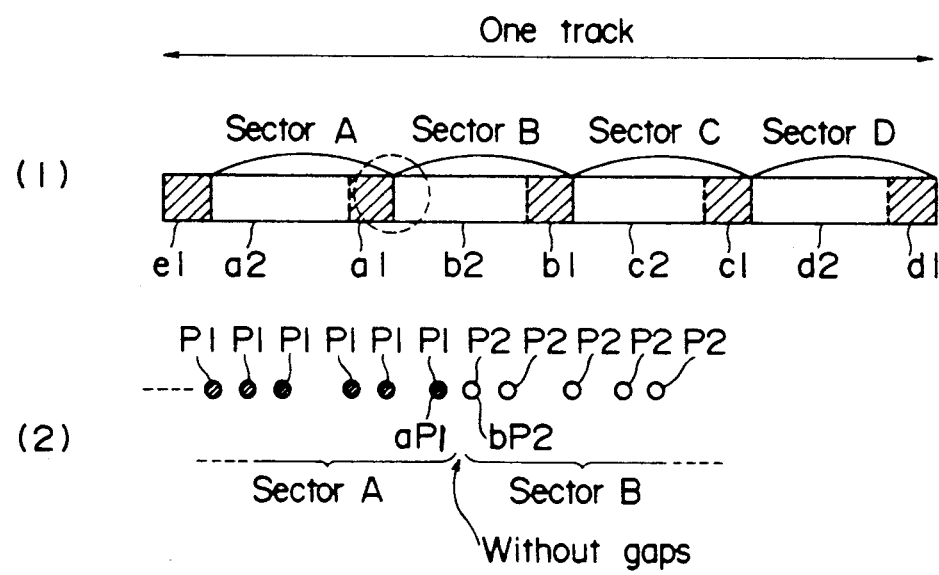
FIG. 7 is a view showing a continuous write format without gaps between sectors.

Referring to FIG. 5, LD represents the semiconductor laser and SC is a signal processor for processing the output signal from photodetector LPD which corresponds to the backward light SP1'. Signal processor SC includes a low pass filter and band pass filters which function to remove noise from the output signal from photodetector LPD. Indicated by CP is a comparator which outputs a predetermined signal according to whether the output from the signal processor SC exceeds a reference level Pc. Thus, the comparator generates a first comparator output, which signifies that the output level Pb is below the reference level Pc, when the return light of recording spot light SP1 is reflected from a pit. Comparator CP outputs a second comparator output, which signifies that the output level Pa is over the reference level Pc, when the return light is from the area where no pit is available. Indicated by DT is a data extractor which, in response to the first and second comparator outputs from comparator CP, reads the pit patterns on tracks TK1, TK2, ... of recording medium RM and extracts track data from the read patterns. SP represents a sector end pattern which detects the end patterns of the respective sectors A to D shown in FIG. 7 in accordance with the output from the data extractor DT. These circuit components, taken together, constitute a detection unit for detecting outputs of the semiconductor laser LD whose output varies in response to the return light of recording spot light SP1 which has been reflected on the tracks TK1, TK2, ... of recording medium RM. By means of the above detection unit, not only the end pattern of each sector can be detected but, at the same time, the last pit in the end pattern of that sector can also be detected.

Indicated by TS is a timing signal generator which, in response to the recorded pit detection output from the detection unit which corresponds to the final recorded pit in the particular sector end pattern, generates a timing signal for the projection of recording spot light SP1 to, for example, the position of the first unrecorded pit P21 in the following sector when the pit P16 is the final pit in the section end pattern as shown in FIG. 2. RC is a recording instruction circuit for outputting a recording instruction signal to the semiconductor laser LD in response to the timing signal from the timing signal generator TS. This recording instruction circuit RC has been preloaded with data on the next and subsequent sectors and is adapted to drive the semiconductor laser LD in accordance with the stored data and in synchronism with the input of the corresponding timing signal.

The operation of the system described above is explained below. Referring first to FIG. 2, it is supposed that P11 to P16 are the pits constituting the end pattern of a given sector and P21 to 24 are the pits constituting the initial area of the next sector and that when the playback spot light SP2 is in the position irradiating the pit P13, the recording spot light SP1 is located between the pit P16 of this sector and the first pit P21 of the next sector. In accordance with the characteristic curves I and II (FIG. 4) which are given by the semiconductor laser LD and photodetector LPD based on the return light of recording spot light SP1, the sector end pattern detection circuit SP operating through the circuits SC, CP and DT outputs to the timing signal generator TS a detection output indicating that the pit P16 is the last pit in the end pattern of the particular sector. In such case, since the recording instruction circuit RC has been preloaded with data on the moving speed of recording medium RM and data on the distance between pits P16 and P21, RC calculates the timing of recording the pit P21 after pit P16 and drives the semiconductor laser LD with a constant current Ia upon arrival of that timing, thereby recording pit P21 with recording spot light SP1.

Thus, in the dual light source optical recording and playback system of this embodiment, the recording spot light SP1 scans in advance of the playback spot light SP2 with respect to the direction of travel of the recording medium RM so that the effective recording speed can be doubled as compared with the system employing a single light source. In addition, in a continuous write format, the end pattern of a given sector is detected by utilizing the return light to the semiconductor laser LD and the last one of the pits constituting the end pattern of the sector for synchronization of sectors is detected so that the first one of the pits constituting the leading pattern of the next sector can be positively and accurately recorded without requiring any complicated position adjustment between the recording spot light and playback spot light.

The above description and the accompanying drawings are merely illustrative of the application of the principles of the present invention and are not limiting. Numerous other arrangements which embody the principles of the invention and which fall within its spirit and scope may be readily devised by those skilled in the art. Accordingly, the invention is not limited by the foregoing description, but is only limited by the scope of the appended claims.

What is claimed is:

1. A dual light source optical recording and playback system comprising:
    a first light source including a semiconductor laser for irradiating tracks of a recording medium with a recording light spot to record pits as information units, said semiconductor laser projecting light in at least two directions, light projected by said semiconductor laser in one of said two directions producing said recording light spot,
    a second light source for irradiating said tracks with a playback light spot,
    an optical system for receiving light from said first and second light sources and causing light from said light sources to irradiate the tracks of said recording medium,
    detection means for detecting the light output of said semiconductor laser projected in the other of said two directions and which changes in response to return light of said recording light spot which is projected on the track of recording medium through said optical system and returned through said optical system to said semiconductor laser, and
    a timing signal generator for generating a timing signal for the recording a subsequent pit on the track in response to a detection output from said detection means which corresponds to the return light due to reflection by a recorded pit.

2. A dual source optical system as in claim 1, wherein said optical system comprises:
    a beam splitter for receiving light from said semiconductor laser;
    a half mirror for receiving light from said semiconductor laser which passes through said beam splitter and directing it toward said recording medium, and for reflection light from said recording medium; and,
    an objective lens for focusing light from said semiconductor laser which passes through said half mirror on said recording medium as said recording light spot; and,
    wherein said second light source comprises:
        a light emitting diode, the output light of said light emitting diode passing through said beam splitter, half mirror and objective lens and being focused on said recording medium as said playback light spot, said recording light spot being incident on said recording medium at a location ahead of said playback light spot in a direction of relative movement of said recording medium.

3. A dual light source optical system as in claim 2, wherein said half mirror provides a reproduction signal from said playback light spot which is reflected off said recording medium.

4. A dual light source optical system as in claim 3, further comprising a condenser lens for receiving reflected light from said playback light spot which is reflected by said half mirror, and a photodetector receiving light from said condenser lens and providing an output signal.

5. A dual light source optical system as in claim 4, wherein said recording light spot and playback light spot are separated by a predetermined distance to prevent said photodetector from receiving light from said semiconductor laser which is reflected from said recording medium.

6. A dual light source optical system as in claim 1, wherein said detection means is accommodated within the same housing which accommodates said semiconductor laser.

7. A dual light source optical system as in claim 1, wherein said detection means comprises: a light detector for receiving and detection said light output of said semiconductor laser projected in said other direction which changes in response to said return light, a signal processor for processing the output signal from said light detector to remove noise, a comparator for providing a first output signal when the output of said signal processor is above a predetermined value and a second output signal when the output of said signal processor is below a predetermined value, means responsive to the output signals of said comparator for extracting track data from signals reproduced from said recording medium, and means responsive to extracted track data for detecting end patterns for data sectors of said recording medium.

8. A dual light source optical system as in claim 1, whereon said subsequent pit is the next pit on said track following said recorded pit.

* * * * *